United States Patent [19]

Takei et al.

[11] Patent Number: 5,319,471
[45] Date of Patent: Jun. 7, 1994

[54] IMAGE TRANSMITTING APPARATUS HAVING IMPROVED CODING OF MULTI-VALUED IMAGE DATA

[75] Inventors: Masahiro Takei; Tadashi Takayama; Hiroyuki Horii; Norio Kimura, all of Tokyo, Japan

[73] Assignee: Canon Kabushiki Kaisha, Tokyo, Japan

[21] Appl. No.: 73,628

[22] Filed: Jun. 8, 1993

Related U.S. Application Data

[63] Continuation of Ser. No. 361,564, Jun. 5, 1989, abandoned.

[30] Foreign Application Priority Data

Jun. 7, 1988 [JP] Japan .................. 63-138512

[51] Int. Cl.$^5$ .............................................. H04N 1/40
[52] U.S. Cl. ........................ 358/451; 358/408; 358/426
[58] Field of Search .......... 358/449, 451, 401, 403–404, 358/408, 426

[56] References Cited

U.S. PATENT DOCUMENTS

| | | | |
|---|---|---|---|
| 4,684,997 | 8/1987 | Romeo et al. | 358/408 |
| 4,698,688 | 10/1987 | Ochi et al. | 358/408 |
| 4,750,044 | 6/1988 | Nakajima | 358/483 |
| 4,760,460 | 7/1988 | Shimotohmo | 358/457 |
| 4,814,893 | 3/1989 | Katoh | 358/449 |
| 4,814,894 | 3/1989 | Yoshida | 358/449 |
| 4,905,097 | 2/1990 | Watanabe et al. | 358/456 |
| 4,965,843 | 10/1990 | van Dorssalaer | 358/457 |
| 5,006,937 | 4/1991 | Nonoshita et al. | 358/456 |

*Primary Examiner*—Stephen Brinich
*Attorney, Agent, or Firm*—Fitzpatrick, Cella, Harper & Scinto

[57] ABSTRACT

An image transmitting apparatus for digitizing a still-picture television signal, a manuscript image signal or the like and transmitting the digitized signal over a line is adapted to read an analog image signal stored in video memory such as a video disk, convert the read analog image signal into a digitized multi-valued signal and store the multi-valued image signal in an image memory. On the basis of paper size on which printing is to be performed by an apparatus, such as a facsimile machine, on the receiving side, the number of pixels constituting the multi-valued image signal stored in the image memory and an ensuing binary coding method, a ratio is obtained at which the multi-valued image signal stored in the image memory is to be expanded or compressed, and the multi-valued image signal is expanded or compressed based on this ratio. The multi-valued image signal thus expanded or compressed is binary coded as by a dither method, and the binary-coded image data are transmitted to the facsimile machine on the receiving side through a line.

26 Claims, 13 Drawing Sheets

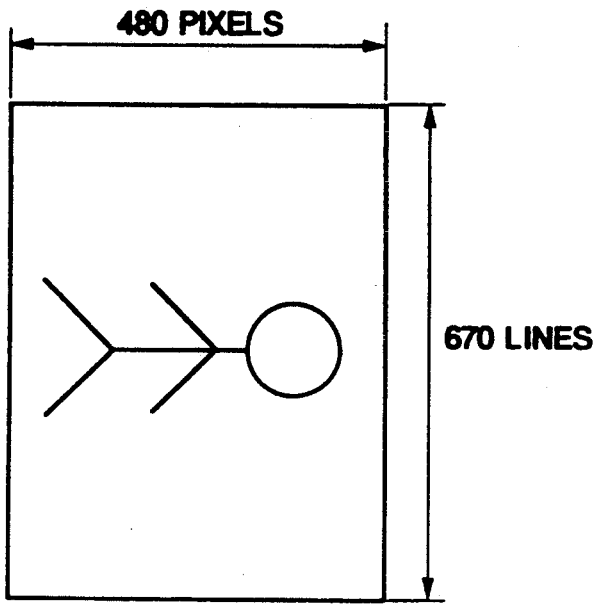
FIG. 4
FIG. 5(a)
| ℓ(0) | ℓ(1) | ℓ(2) | ℓ(3) | ℓ(4) | ℓ(5) | ---- |
FIG. 5(b)
| L(0) | L(1) | L(2) | L(3) | L(4) | L(5) | L(6) | ---- |

| 0 | 8 | 2 | 10 |
|---|---|---|---|
| 12 | 4 | 14 | 6 |
| 3 | 11 | 1 | 9 |
| 15 | 7 | 13 | 5 |

F I G. 10

| DITHER PATTERN | LEVEL RANGE | DITHER PATTERN | LEVEL RANGE |
|---|---|---|---|
|  | 240 ~ 255 |  | 112 ~ 127 |
|  | 224 ~ 239 |  | 96 ~ 111 |
|  | 208 ~ 223 |  | 80 ~ 95 |
|  | 192 ~ 207 |  | 64 ~ 79 |
|  | 176 ~ 191 |  | 48 ~ 63 |
|  | 160 ~ 175 |  | 32 ~ 47 |
|  | 144 ~ 159 |  | 16 ~ 31 |
|  | 128 ~ 143 |  | 0 ~ 15 |

IMAGE TRANSMITTING APPARATUS HAVING IMPROVED CODING OF MULTI-VALUED IMAGE DATA

This application is a continuation of application Ser. No. 07/361,564 filed Jun. 5, 1989, now abandoned.

BACKGROUND OF THE INVENTION

1. Field of the Invention

This invention relates to an image transmitting apparatus and, more particularly, to an image transmitting apparatus for digitizing a still-picture television signal, a manuscript image signal or the like and transmitting the digitized signal over a line.

2. Description of the Prior Art

A still-picture transmitting apparatus has recently been proposed and developed in which one frame of a still-picture video signal reproduced from a floppy disk storing video data is temporarily stored in a memory, and the picture signal is successively read out of the memory and transmmitted through a line in conformance with the transmission speed. Most transmitting apparatus of this kind employ digital transmission owing to the recent popularization of transmission by personal computer, the higher speed of modem devices and the lower cost thereof. Some of these transmitting apparatus are capable of transmitting a color picture and generally do so using RGB or Y and color difference signals (R-Y), (B-Y) as color information. If the transmission protocols are made to conform, such an apparatus is capable of transmitting a picture signal also to a bi-level facsimile machine, which is becoming increasingly popular.

In such case, it is necessary to convert a color television signal, in which one pixel (picture element) ordinarily is expressed in 256 tones, into a black-and-white binary signal. The simplest method of achieving this binary conversion entails comparing a luminance signal Y with the central level (127) of the 256 tones, and making the signal "1" when it is above the central level and "0" when it is below the central level, thereby deciding black or white, by way of example. A common binary coding method is the dither processing method, in which binary conversion is performed by making, e.g., a $4 \times 4$ dither matrix correspond to each pixel level obtained by sampling the television signal.

The number of pixels in the main scanning direction of common facsimile machines is set in conformity with paper size by the CCITT advisory. For instance, the figure is 1728 dots in the case of size A4. On the other hand, the number of items of pixel data according to television standards is unrelated to paper size. For example, consider a case where a video memory storing a television signal is composed of 640 (pixels)$\times$480 (lines), and binary coding according to the dither method is adopted by employing the vertical direction of data in the video memory as the main scanning direction. If the size of the dither matrix in such case is $4\times 4$, then the number of dots in the main scanning direction of the digitized image data will be $480\times 4 = 1920$ (dots). As mentioned above, the pixel size of A4 paper is 1728. Therefore, in order to print a television picture signal on size A4 paper, it is necessary to discard the extra 198 dots ($1920 - 1728 = 198$). If the dither matrix is a $3 \times 3$ matrix, then the number of dots in the main scanning direction will be $480 \times 3 = 1440$ (dots), which will fit into the size A4 paper width (1728 dots). However, this means that approximately 12% of the paper area will be wasted. Another problem is that tone expression is diminished by reducing the $4 \times 4$ dither matrix to the $3 \times 3$ dither matrix. These problems are not limited solely to binary coding using the dither method. The same problems arise also when performing binary coding by the error diffusion method or dot pattern method, and when simply binary coding and transmitting image data which conform to television standards, by way of example.

SUMMARY OF THE INVENTION

An object of the present invention is to provide an image transmitting apparatus in which an image signal is made to conform to the paper size of the apparatus on the receiving side, and the signal is transmitted upon converting the image size.

Another object of the present invention is to provide an image transmitting apparatus in which a multi-valued image signal can be binary coded and transmitted in such a manner that the image can be received and reproduced even by a conventional bi-level facsimile machine.

Still another object of the present invention is to provide an image transmitting apparatus in which image data made to conform to paper size on a receiving side can be transmitted by interpolating or thinning out digitized image data in accordance with the paper size on the receiving side.

A further object of the present invention is to provide an image transmitting apparatus capable of digitizing a video signal, converting a multi-valued signal to a binary signal and transmitting the signal.

Yet another object of the present invention is to provide an image transmitting apparatus in which image data converted into a multi-valued digital signal is normalized, thereby making it possible to transmit an image signal upon correcting for differences in exposure conditions of the image signal.

Yet another object of the present invention is to provide an image transmitting apparatus in which a television picture signal of a size smaller than that of ordinary paper can be enlarged in conformity with paper size on the receiving side and transmitted upon being converted into a binary signal.

Yet another object of the present invention is to provide an image transmitting apparatus in which a television picture signal of a size larger than that of ordinary paper can be compressed in conformity with paper size on the receiving side and transmitted upon being converted into a binary signal.

According to the present invention, the foregoing objects are attained by providing an image transmitting apparatus for transmitting input image data through a line, comprising means for expanding or compressing the input image data based on numbers of pixels in horizontal and vertical directions of the input image data and a number of pixels of a prescribed paper size, and transmitting means for transmitting the expanded or compressed image data.

In another aspect of the invention, the foregoing objects are attained by providing an image transmitting apparatus for transmitting input image data through a line, comprising discriminating means for discriminating paper size on which an image signal will be reproduced and printed by a device on a receiving side, means for expanding or compressing the input image data based on numbers of pixels in horizontal and vertical directions of the input image data, and the paper size, and transmitting means for transmitting the expanded or compressed image data through a line to the device on the receiving side.

In another aspect of the invention, the foregoing objects are attained by providing an image transmitting apparatus for binary coding a video signal and transmitting the binary-coded signal through a line, comprising video input means for reading out a video signal stored in a video memory, converting means for digitizing an analog image signal read out by the video input means to convert the image signal into a multi-valued image signal, memory means for storing the multi-valued image signal, discriminating means for discriminating paper size on which the image signal will be reproduced and printed by a device on a receiving side, expanding/compressing means for expanding or compressing the multi-valued image signal based on a number of pixels constituting the multi-valued image signal stored in the memory means, and the paper size, binary coding means for binary coding the expanded or compressed multi-valued image signal, coding means for coding binary image data binary coded by the binary coding means, and transmitting means for transmitting the image data, which has been coded by the coding means, through a line to the device on the receiving side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A through 2C are views illustrating examples of luminance level distributions in one frame of video data, in which FIG. 2A shows the luminance distribution in a normalized state, FIG. 2B a luminance distribution at the time of underexposure, and FIG. 2C a luminance distribution at the time of overexposure;

FIG. 4 is a view illustrating the composition of image data used in the present embodiment;

FIG. 5, consisting of FIGS. 5(a) and 5(b), is a view an example of pixel interpolation in a main scanning direction (horizonal direction);

FIG. 10 is a view illustrating an example of a dither matrix pattern;

DESCRIPTION OF THE PREFERRED EMBODIMENT

A preferred embodiment of the invention will now be described in detail with reference to the accompanying drawings.

Description of Transmitting Apparatus (FIG. 1)

Figure 1A:
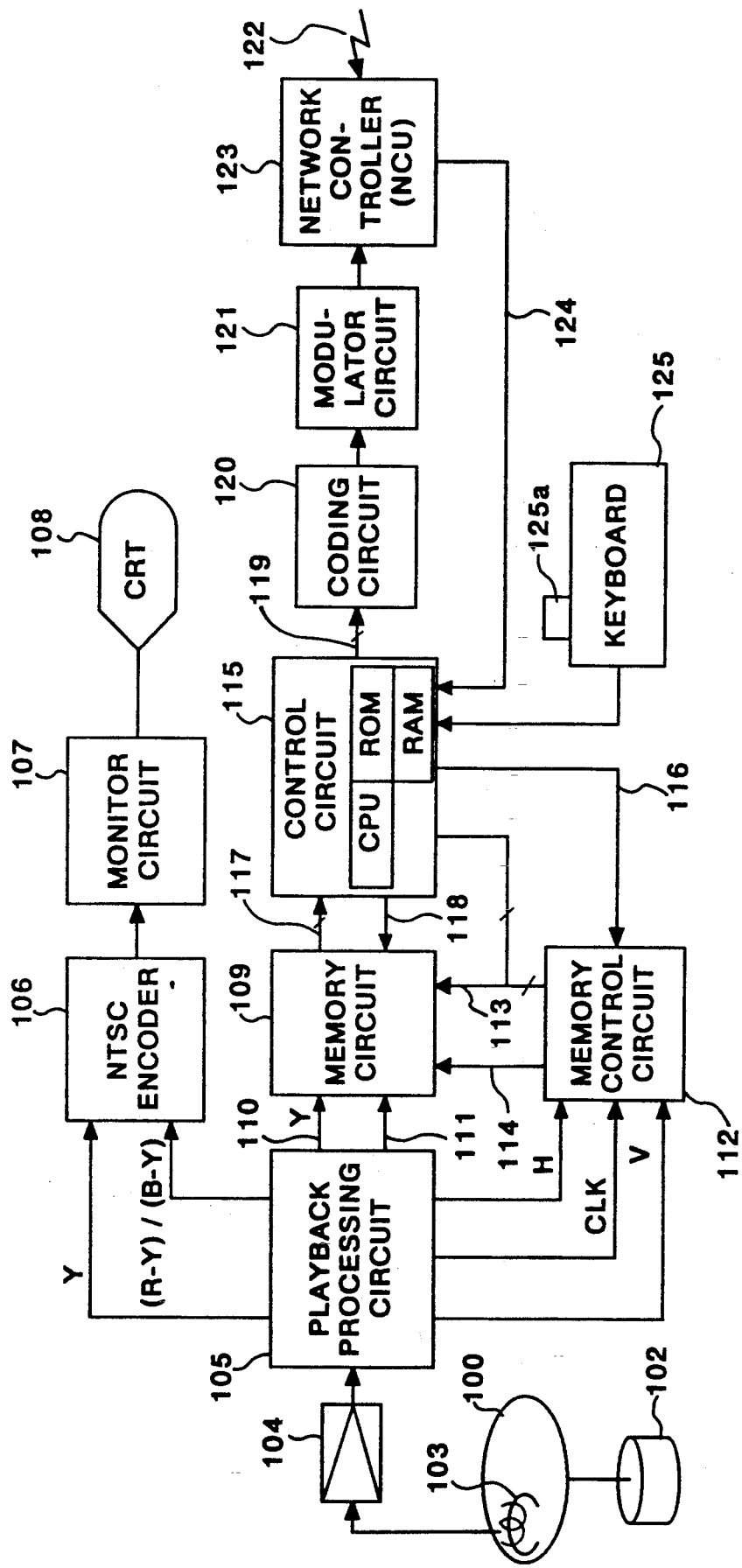
FIG. 1A is a block diagram illustrating the general construction of an image transmitting apparatus embodying the present invention.

FIG. 1A is a block diagram illustrating the general construction of an image transmitting apparatus embodying the present invention.

As shown in FIG. 1A, a video floppy disk 100 storing a video signal such as a still-video signal is rotatively driven by a motor 101. The video signal recorded on the video floppy 100 is read by a playback magnetic head 103. The read video signal is amplified by a playback amplifier 104, and the amplified signal is applied to a playback processing circuit 105. The latter restores the base band level video signal and provides an NTSC (National Television System Committee) encoder 106 with a luminance signal Y and a line sequential color difference signal (R-Y)/(B-Y). Meanwhile, upon receiving the video signal applied thereto, the playback processing circuit 105 converts the luminance signal Y and the color luminance signals into a multi-valued digital signals 110, 111, respectively, and delivers these signals to a memory circuit 109. At the same time, in synchronization with the video signal, the processing circuit 105 outputs a horizontal synchronizing signal H, vertical synchronizing signal V and pixel clock signal CLK to a memory control circuit 112. As a result, upon receiving a freeze start signal 116 from a control circuit 115, the memory control circuit 112 outputs an address signal 113 and a write signal 114 to the memory circuit 114 so that one frame of multi-valued image data can be stored in the memory circuit 109.

On the basis of the entered luminance signal Y and color difference signal (R-Y)/(B-Y), the NTSC encoder 106 forms an NTSC color television signal, which is displayed on a CRT 108 upon being acted on by a monitor circuit 107 similar to a receiver circuit of a color television receiver. In this way a playback video signal reproduced by the playback magnetic head 103 can be verified on the CRT 108.

Figure 3:
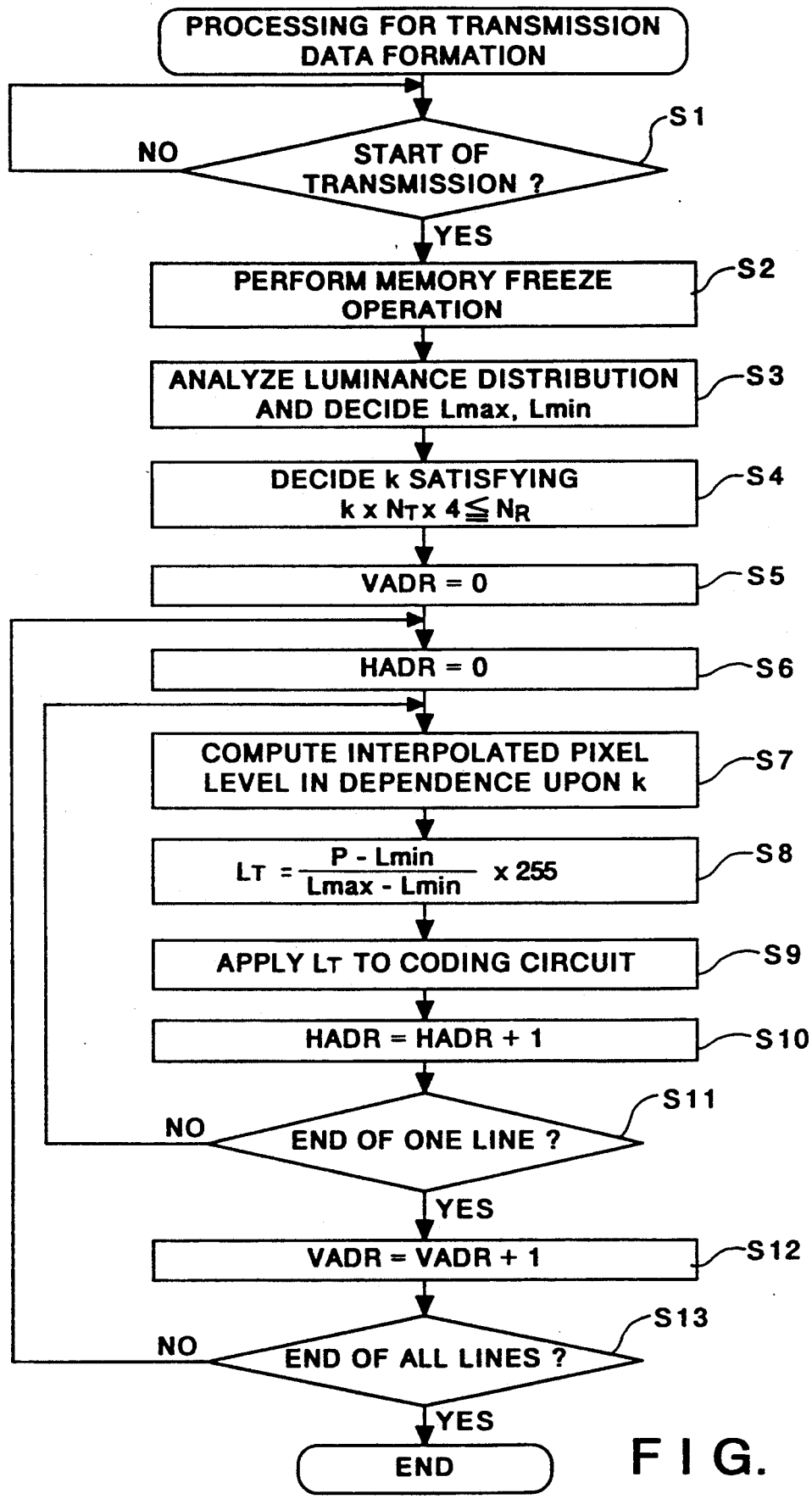
FIG. 3 is a flowchart illustrating processing, executed by a control circuit, for originating transmission data upon expanding image data.

As described above, the memory control circuit 112 is provided with the horizontal synchronizing signal H, vertical synchronizing signal V and pixel clock signal CLK from the playback processing circuit 105 and delivers the address data 113 and write signal 114 to the memory circuit 109 in accordance with an instruction from the control circuit 115, thereby controlling the data write operation of the memory circuit 109. The control circuit 115, which is for overall control of the apparatus, contains a CPU which outputs various control signal to control the overall apparatus, a ROM storing the CPU control program, which is indicated by the flowchart of FIG. 3, as well as various data, and a RAM used as the work area of the CPU.

When transmission of the image data currently being displayed on the CRT 108 is commanded by a key 125a on a keyboard 125, the control circuit 115 delivers the freeze start signal 116 to the memory control circuit 112 to start the same. In response, a single frame of multi-valued digital image data of the luminance signal Y 110 and color difference signal 111 currently displayed on the CRT 108 is written in the memory circuit 109.

When one frame of multi-valued image data is thus written in the memory circuit 109, the control circuit 115 outputs a read signal 118 and an address signal 113 to the memory circuit 109, whereby one frame of image data 117 is read out of the memory circuit 109 and stored in the RAM of the control circuit 115.

The image data 117 thus read and stored in the RAM are subjected to interpolation processing and a normalizing operation, described later, within the control circuit 115. Normalized multi-valued image data 119 from the control circuit 115 are delivered to the next stage, which is a coding circuit 120. Here the input multi-valued image data 119 are binary coded using a dither matrix or the like, and the resulting binary data are coded by, e.g., run length to be converted into serial data delivered to a modulator circuit 121. The latter modulates the input serial data into a signal format transmittable via, e.g., a public branch exchange, and delivers the data to a line 122. A network control unit (NCU) 123 controls communication with the line 122, discriminates the paper size, which is used in the apparatus on the receiving side, by the communication control procedure for communication with this receiving apparatus, and informs the control circuit 115 of the paper size via a signal line 124. The keyboard 125 serves as a control panel. When it is desired to transmit an image being displayed on the CRT 108, the operator presses the key 125a on the keyboard 125, whereby the digital signal representing this video signal can be stored in the memory circuit 109 and transmitted upon being subjected to the required processing.

Figure 1B:
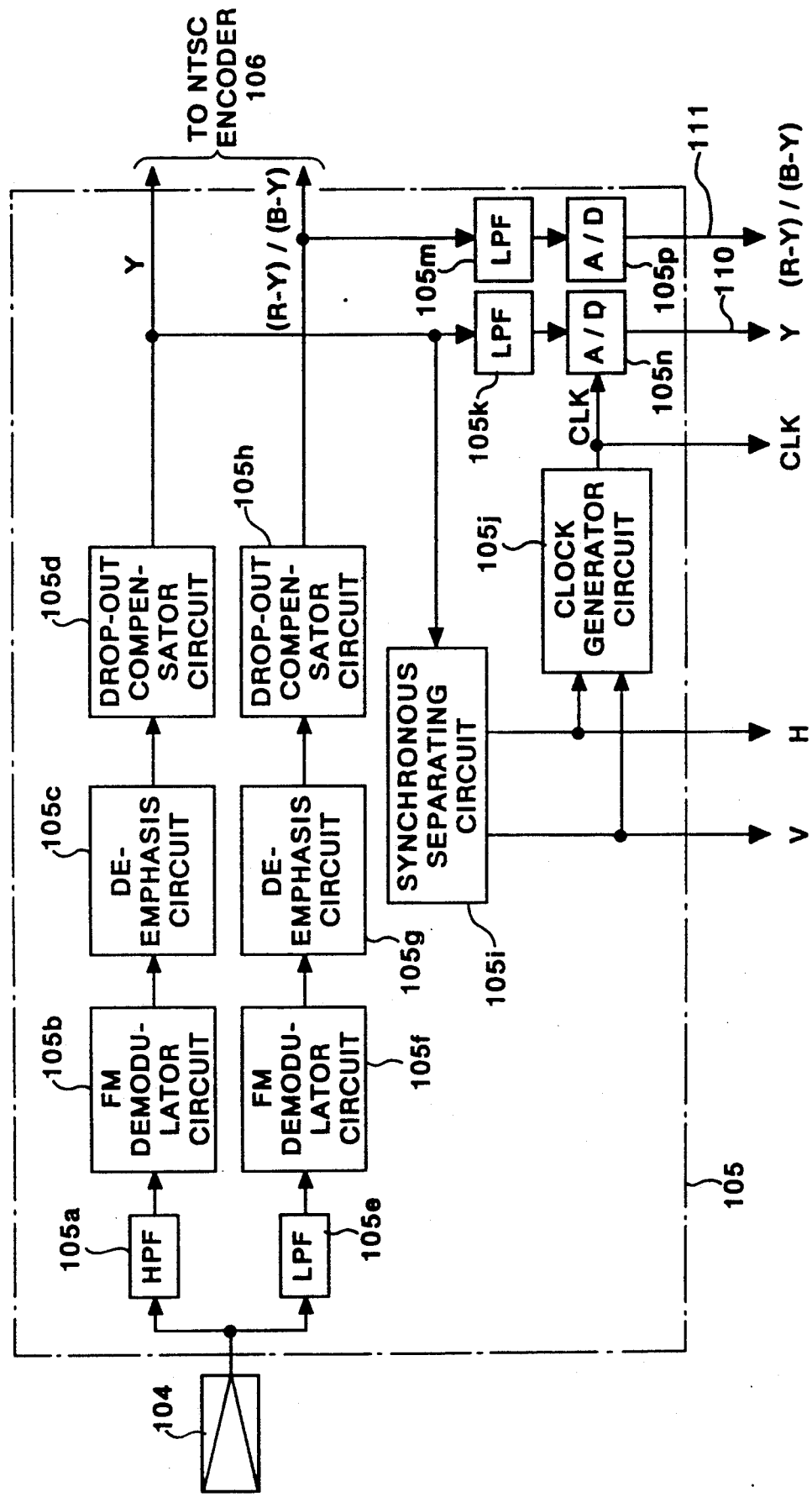
FIG. 1B is a block diagram illustrating the general construction of a playback processing circuit in FIG. 1A.

FIG. 1B is a block diagram illustrating the general construction of the playback processing circuit 105 of FIG. 1A.

The playback video signal amplified by the playback amplifier 104 has is Y signal component separated by a high-pass filter (HPF) 105a and its color difference signal component separated by a low-pass filter (LPF) 105e. The signal components are formed as the luminance signal Y and color difference signal (R-Y)/(B-Y), respectively, by FM demodulator circuits 105b, 105f; de-emphasis circuits 105c, 105g; and drop-out compensator circuits 105d, 105h; respectively. These signals are outputted to the NTSC encoder 106.

The luminance signal Y is separated into the horizontal synchronizing signal H and vertical synchronizing signal V by a synchronous separating circuit 105i, and the synchronizing signals are outputted to a clock generator circuit 105j and the memory control circuit 112, which is the next stage. In response to these synchronizing signals, the clock generator circuit 105j forms an image signal sampling clock (CLK) and delivers the clock to A/D converters 105n, 105p and to the memory control circuit 112.

The Y signal and color difference signal respectively outputted by the drop-out compensator circuits 105d, 105h are converted into digital signals by the A/D converters 105n, 105p upon passing through low-pass filters (LPF) 105n, 105p, respectively. These digital signals are delivered to the memory circuit 109.

Description of Transmission Data Formation Processing (FIGS. 1, 3)

FIG. 3 is a flowchart illustrating transmission data formation processing performed in the control circuit 115 of the embodiment. In the case illustrated, the size of the image data is assumed to be smaller than the size of the paper used on the receiving side. This processing is executed by the CPU of the control circuit 115. The program for implementing this processing is stored in the ROM of the control circuit 115.

When read-out and transmission of the image data are commanded by the key 125a of keyboard 125 at step S1 of the flowchart, the program proceeds to a step S2, where freeze start signal 116 is delivered to the memory control circuit 112. In response, the luminance signal Y 110 and color difference signal 111 of the single frame of playback image data currently displayed on the CRT 108 are written in the memory circuit 109. This is followed by a step S3, at which the address signal 113 and read signal 118 are outputted to the memory circuit 109 to read the frame of image data out of the memory circuit 109. If it is already known that the apparatus on the receiving side of the transmission is a bi-level facsimile machine, it will suffice to write only the luminance signal Y 110 in the memory circuit 109 from the playback processing circuit 105 or, when a read-out is made from the memory circuit 109, to read out only the lumininance signal Y. Thus, one frame of image data is read out of the memory circuit 109 and stored in the RAM of the control circuit 115. The state of the luminance level distribution of the luminance signal is analyzed by the control circuit 115.

Figure 2A:
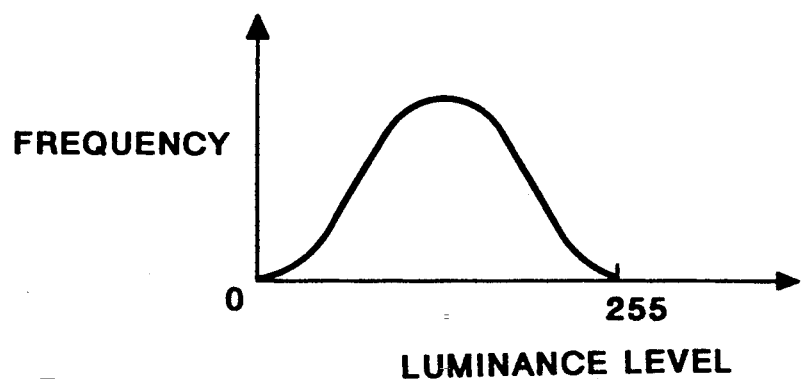
Figure 2B:
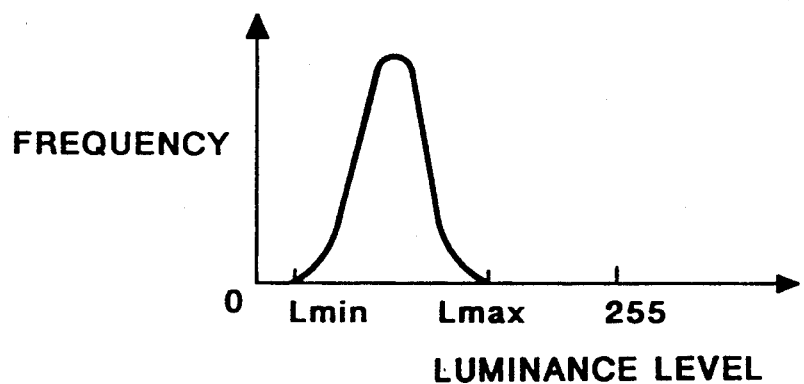
Figure 2C:
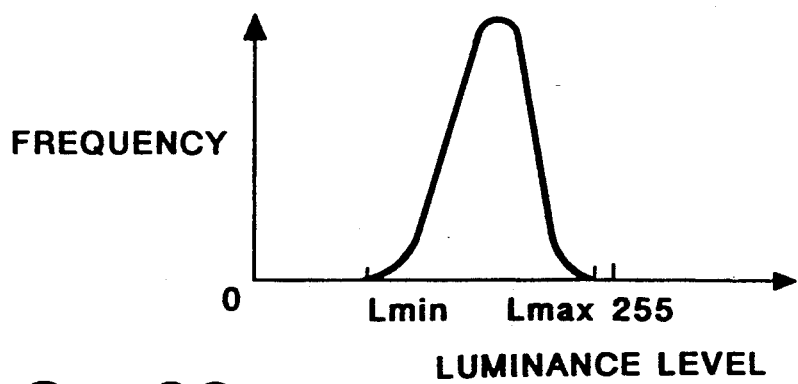

FIGS. 2A through 2C are views illustrating examples of distributions of image data luminance level, in which imaged luminance level is plotted along the horizontal axis and a frequency distribution of each imaged luminance level is plotted along the vertical axis. FIG. 2A shows the frequency distribution of a luminance level (eight bits) under proper exposure conditions. The frequency distribution in this case in uniform. FIG. 2B illustrates the case for underexposure, where it is seen that the imaged luminance level is offset to the low side. FIG. 2C illustrates the case for overexposure, where it is seen that the imaged luminance level is offset to the high side. In any case, $L_{max}$ is decided by the maximum luminance level of all pixel data of the image data (the luminance signal), and $L_{min}$ is decided by the minimum luminance level of all of these pixel data.

Though there is the method of deciding $L_{max}$, $L_{min}$ by checking the luminance level of all pixels of the entire frame, it is permissible to adopt an arrangement in which several representative pixels of the frame are selected and the maximum and minimum luminance levels are decided from the selected pixels. Further, if an arrangement is adopted in which pixel data the number whereof corresponds to 5% of the total pixel data are excluded, in the order of the lower luminance levels, from the pixels of minimum luminance level contained in all pixel data of the frame, pixel data the number whereof corresponds to 5% of the total pixel data are excluded, in the order of the higher luminance levels, from the pixels of maximum luminance level contained in all pixel data of the frame, after which the maximum luminance level $L_{max}$ and minimum luminance level $L_{min}$ are decided based on the maximum and minimum luminance levels in all of the remaining pixel data, then this will diminish the influence of image data having extremely high or low luminance levels due to noise or the like.

When $L_{max}$ and $L_{min}$ are thus decided, the program proceeds to step S4, at which the number of pixels on the transmitted side and the number of pixels on the receiving side are matched. This involves deciding the value of a magnification k which satisfies the relation $$4 \times k \times N_T \leq N_R$$

where $N_R$ represents the number of printed dots (the number of pixels) per line based on the size of the recording paper used on the receiving facsimile machine, and $N_T$ repesents the number of sampled pixels when the image signal is digitized by the playback processing circuit 105 on the transmitting side. As regards to the value "4" in the foregoing expression, the arrangement of this embodiment is such that the transmitted image data are binary coded by a 4×4 dither pattern. Consequently, the value "4" expresses that the number of pixels on one line after coding is multiplied by four in the main scanning direction. If a 3×3 dither pattern were to be used, then the value would be "3" in the above expression. By way of example, $N_T$ will be 480 assuming that the image size on the transmitting side is 480 pixels (in the horizontal direction)×640 lines (in the vertical direction), as shown in FIG. 4.

Specific examples of the numerical values of these coefficients are shown in the following table:

| k | NT | NUMBER OF DOTS IN IMAGE AREA | NR | RECEIVED SIZE |
|---|---|---|---|---|
| 7/8 | 480 | 1680 | 1728 | A4 |
| 1/1 | 480 | 1920 | 2048 | B4 |
| 5/4 | 480 | 2400 | 2432 | A3 |

When the magnification k is thus decided based on the image size on the transmitting side and paper size on the receiving side, a vertical address VADR of a transmitted pixel is made "0" at step S5, and a horizontal address HADR of the transmitted pixel is made "0" at step S6. Since the image data have already been read into the RAM of control circuit 115 from the memory circuit 109, as described earlier, processing set forth below is performed by referring to the image data stored in this RAM. Further, it is permissible for the decision regarding the size of the paper on the receiving side to be made in accordance with the control information from the NCU 123, as described above. Alternatively, paper sizes can be stored beforehand as a data table in the ROM of the control circuit 115 so as to correspond to the facsimile telephone numbers of other parties, and then paper size on the receiving side can be decided by referring to the table.

Next, the program proceeds to step S7, at which transmission pixel data $L_T$ are obtained by computation based on pixel data l(i) and r(j) in accordance with the magnification k obtained at step S4. Here l(i) represents the pixel data, in the main scanning direction, stored in the memory circuit 109, and r(j) represents the pixel data in the auxiliary scanning direction, also stored in the memory circuit 109. It should be noted that i, j are numerical values indicating pixel position in the horizontal and vertical directions, respectively.

The method of obtaining transmission pixel data $L_T$ will now be described.

Figures 6A, 6B:
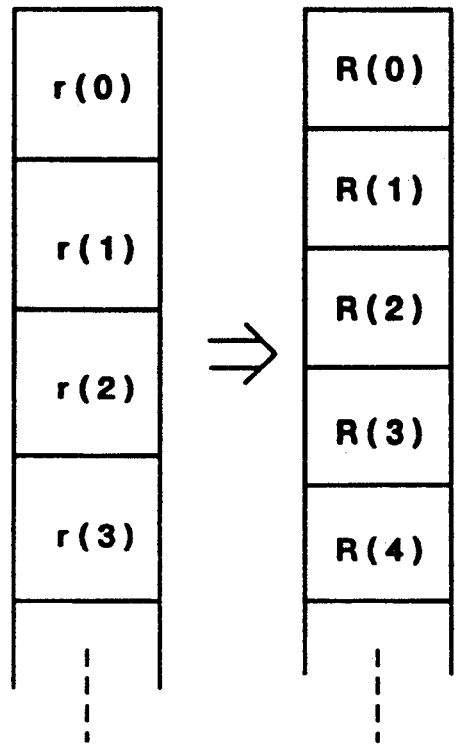
FIG. 6, consisting of FIGS. 6(a) and 6(b), is a view an example of pixel interpolation in an auxiliary scanning direction (column direction)

Description of Pixel Interpolation (FIGS. 5, 6)

FIG. 5 is a view illustrating interpolation in the main scanning direction for a case where k=5/4 in the abovementioned table.

In FIG. 5, l(0), l(1), . . . represent pixel data in the main scanning direction, and L(0), L(1), L(2) . . . represent horizontal-direction pixel level in which the number of pixels is expanded by 5/4 times (i.e., a case in which the number of pixels in the main scanning direction on the receiving side is 480 and the paper size on the receiving side is A3). Here each pixel is interpolated by one-dimensional linear interpolation, giving the following:

$$L(0) = l(0)$$
$$L(1) = \{ \times l(0) + 4 \times l(1)\}/5$$
$$L(2) = \{2 \times l(1) + 3 \times l(2)\}/5$$
$$L(3) = \{3 \times l(2) + 2 \times l(3)\}/5$$
$$L(4) = \{4 \times l(3) + \quad l(4)\}/5$$

From L(5) onward, the same cycle repeats itself every five pixels of the expanded pixels. That is, L(5)=l(4), L(6)={l(4)+4×l(5)}/Z5, L(7)={2×l(5)+3×l(6)}/5 . . . , and so on.

It should be noted that the interpolation is not limited to the foregoing one-dimensional linear interpolation, for it is permissible to employ higher dimensional interpolation, interpolation using a convolution for implementing an ideal LPF (low-pass filter), etc.

FIG. 6 is a view showing the manner in which interpolated data in the main scanning direction, shown in FIG. 5, are interpolated further in the auxiliary scanning direction.

In FIG. 6, r(0)–3(3) represent pixel data in the auxiliary scanning direction, and R(0)–R(3) represent pixel data in which the number of pixels is expanded by 5/4 times. The pixel interpolation in the vertical direction is transformed as shown by the following expressions just as in the case of the main scanning direction described above, and the cycle repeats itself every five pixels from R(5) onward:

$$R(0) = r(0)$$
$$R(1) = \{ \times r(0) + 4 \times r(1)\}/5$$
$$R(2) = \{2 \times r(1) + 3 \times r(2)\}/5$$
$$R(3) = \{3 \times r(2) + 2 \times r(3)\}/5$$
$$R(4) = \{4 \times r(3) + \quad r(4)\}/5$$

The transmission pixel data are decided based on the L(i), R(j) thus obtained. It should be noted that L(i) and R(j) are uniquely defined by the address HADR in the main scanning direction and the address VADR in the auxiliary scanning direction of the pixel data to be transmitted, namely by the line of the transmitted pixel and the dot position in the horizontal direction, respectively. Accordingly, by suitably selecting any of the foregoing operational algorithms in accordance with the addresses HADR, VADR of the pixel data to be transmitted, the value of the transmitted pixel data can be obtained.

When the interpolated image data [L(i) or R(j)] is thus decided at step S7, the program proceeds to step S8, at which the transmitted pixel data $L_T$ are obtained by normalizing these interpolated pixels using the maximum and minimum luminance levels $L_{max}$, $L_{min}$ obtained at step S3. The normalized transmitted pixel data $L_T$ are obtained in accordance with $$L_T = \{(P - L_{min})/(L_{max} - L_{min})\} \times 255 \quad (1)$$

where P represents the abovementioned interpolated pixel data [L(i), R(j)], and $L_T$ represents the transmitted pixel data. As a result, even if the pixel data are distributed between $L_{min}$ and $L_{max}$, as shown for example in FIG. 2B or 2C, image data normalized to values between concentration levels of "0" and "255" can be obtained.

This normalization processing is performed for the following reasons. If the tone image data recorded on the video floppy 100 are binary coded as is, no problems arise so long as the tone image data are picked up under the proper exposure conditions, as shown in FIG. 2A. However, if imaging is performed under conditions of underexposure or overexposure, as described above with reference to FIGS. 2B and 2C, the luminance distribution of the imaged signal will be offset along the level axis. If such a television signal were to be binary coded as is, the binary-coded image data would produce a blackish or whitish image due to a variance in the exposure conditions at the time of image pickup, and the optimum binary-coded image would no longer be obtained. In order to prevent this, each pixel of the image data is normalized prior to binary coding in accordance with the embodiment.

When the transmission pixel data $L_T$ thus normalized are obtained, the program proceeds to step S9, at which the data $L_T$ are outputted to the coding circuit 120 as image data 119. The image data binary coded by the coding circuit 120 are modulated by modulator circuit 121 and outputted on line 122.

When the processing of the image data in the main scanning direction ends, the horizontal address HADR of the transmitted pixel is incremented at step S10. Next, it is determined at step S11 whether processing for obtaining one line of pixel data [in the illustrated embodiment, 600 pixels (480×5/4)] has ended. If the processing for one line has not ended, the program returns to step S7 and the foregoing processing is repeated. When the processing for obtaining one line of pixel data ends, the program proceeds to step S12, at which the vertical address VADR is incremented, and then to step S13. If it is found here that processing for all lines of pixel data (670×5/4=837 lines in the case of the image data shown in FIG. 4) has not ended, the program returns to step S6, the horizontal address HADR of the transmitted pixel data is made "0" and the first transmission pixel on the next line is designated. The processing described thus far is executed repeatedly until all lines of the transmission pixel data are obtained.

Image data are expanded in the case described above. A case will now be discussed in which image data composed of a large number of pixels are thinned out (compressed) for transmission to an apparatus so that the apparatus may print out the data using paper whose size is too small to accept all of the original data.

Figure 7:
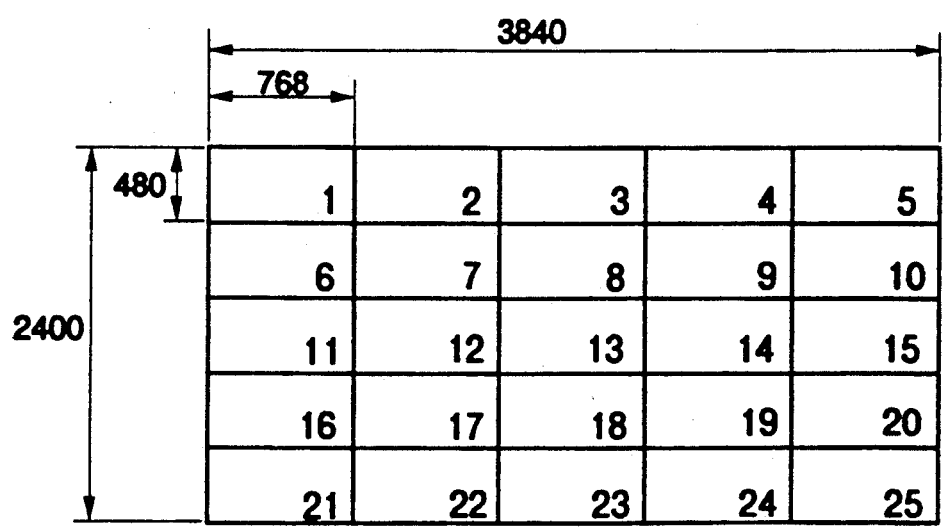
FIG. 7 is a view illustrating multi-images comprising 25 frames of a television image.

FIG. 7 illustrates the manner in which 25 frames of television images are stored in the memory circuit 109. The numerals each express one frame of a television image, and each frame is composed of 768 pixels in the horizontal direction and 480 pixels in the vertical direction. Accordingly, the total of 25 frames represents image data composed of 3840 pixels in the horizontal direction and 2400 pixels in the vertical direction.

Consider a case where these image data are transmitted to a facsimile apparatus to be printed on size A4 recording paper. In G3 facsimile transmission, the number of pixels per one line of A4 paper is 1728. Therefore, in order to transmit and record the multi-image data of FIG. 7, 3840 pixels must be thinned out to give the total of 1728 pixels. In this embodiment, the pixels are thinned out by performing linear interpolation.

Figure 12:
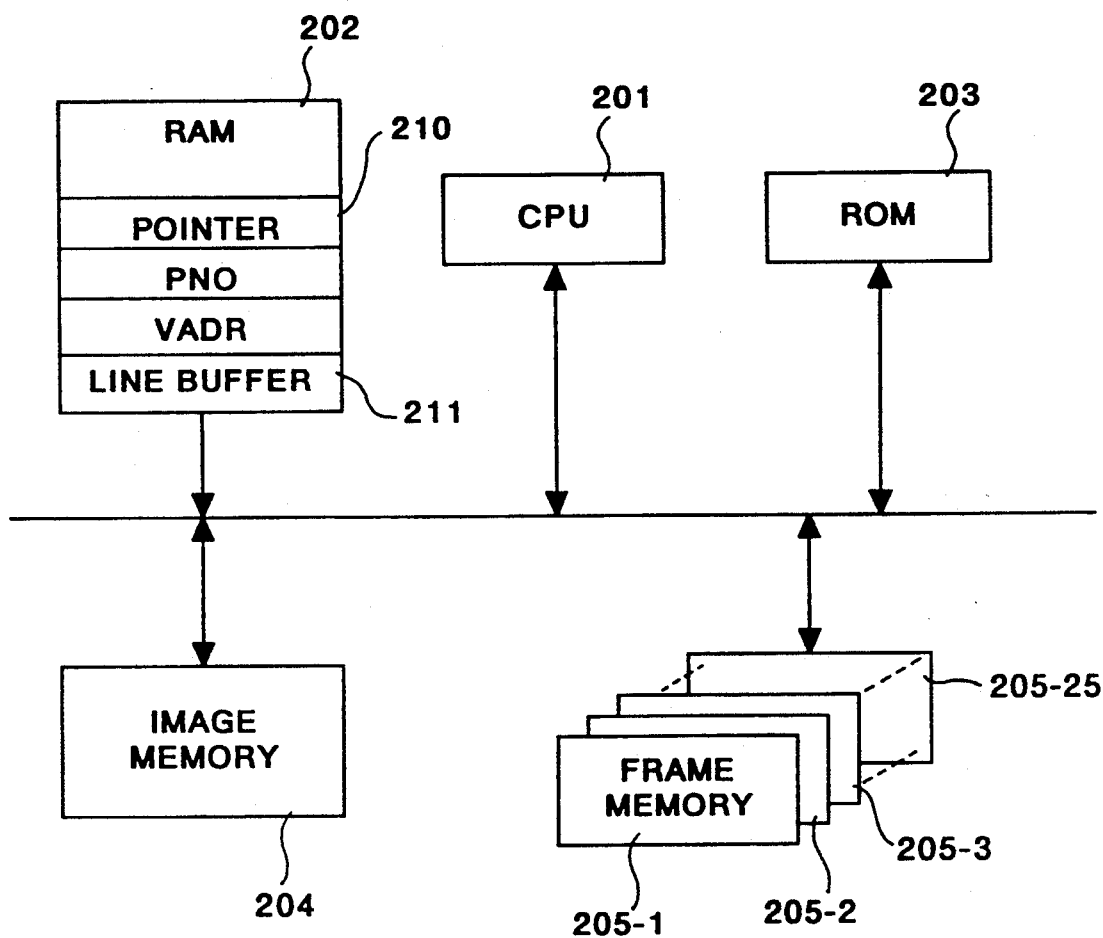
FIG. 12 is a block diagram showing the construction of a control circuit in another embodiment of the invention.

FIG. 12 is a block diagram showing the construction of a control circuit 115a of another embodiment of the image transmitting apparatus for transmitting the multi-image data shown in FIG. 7.

In FIG. 12, numeral 201 denotes a CPU for controlling the system by performing control in accordance with a control program stored in a ROM 203. Numeral 202 denotes a RAM used as the working area of the CPU 201. An image memory 204 stores multi-frame index image data and has a capacity the same as that of the memory circuit 109. Numerals 205-1 through 205-5 denote frame memories each for storing one frame of image data displayed on the CRT monitor 108. Each frame memory has a capacity the same as that of the memory circuit 109. The number of frame memories corresponds to the number of frames combined to form the multi-image. For example, in the case of FIG. 7, 25 frame memories (205-1 through 205-25) are provided.

When transmission of the multi-image data has been designated, the image data stored in memory circuit 109 are successively transferred to the frame memory 205 and, at the same time, image data thinned out to 1/5 of the original amount of data in the horizontal and vertical directions are written in the image memory 204. Thus, the multi-image data of image memory 204 are created before image transfer, and the multi-image data transmitted by the monitor 108 can be verified. When the multi-image data are transferred, the image data in the frame memory 205 are successively read and transmitted, whereby the multi-image data shown in FIG. 7 can be created.

Thinning out of the multi-image data thus created will be described hereinbelow.

Figure 8A:
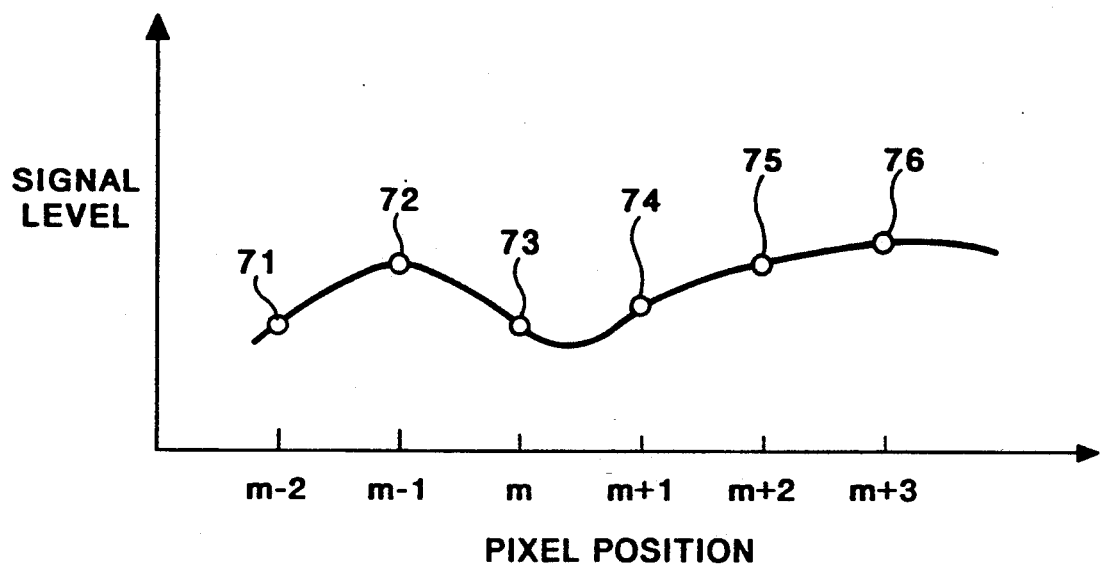
FIG. 8A is a view illustrating signal levels of pixels in the horizontal direction of original image data.
Figure 8B:
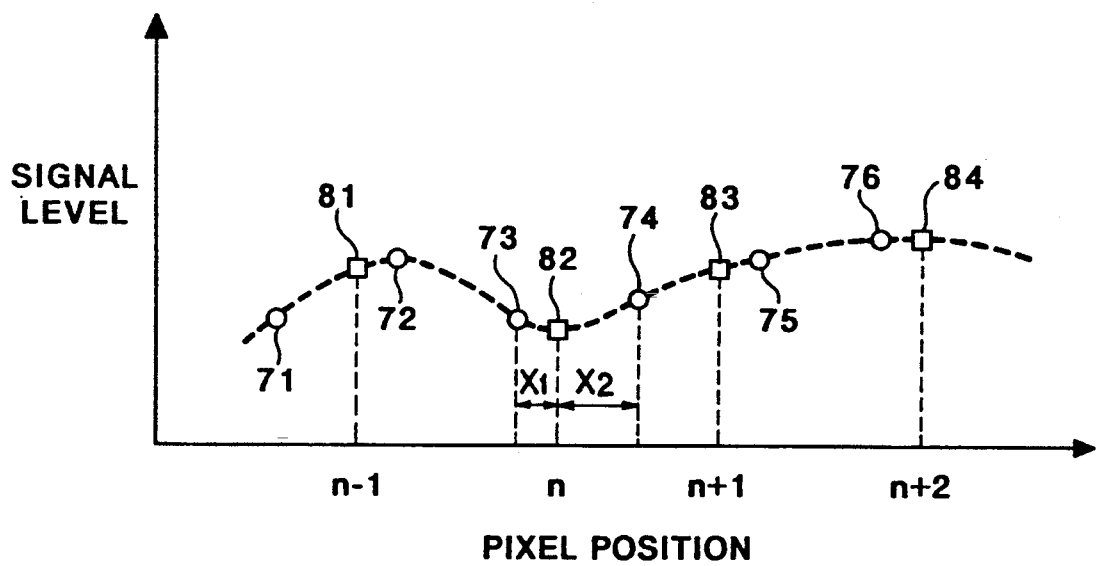
FIG. 8B is a view showing an example of image data obtained by thinning out original image data by linear interpolation.

FIGS. 8A and 8B are views for describing thinning out of pixels. Numerals 71-76 denote pixels of the original image data. These indicate (m−2)th, (m−1)th, m-th ... (m+3)th pixels in the horizontal direction, respectively. Numerals 81-84 denote compressed pixels formed by thinning out the pixels 71-76 of the original image data. These indicate (n−1)th, n-th, (n+1)th, (n+2)th pixels in the horizontal direction, respectively. Here the signal level of the n-th pixel 82 is calculated by linear interpolation of the original pixels 73, 74 bracketing the n-th pixel 82. More specifically, the signal level of the n-th pixel 82 can be obtained from $$a_n = a_m + (a_{m+1} - a_m)x_1/(x_1 - x_2) \quad (2)$$

where $x_1$ is the distance between pixel 82 and the original pixel 73, $x_2$ is the distance between pixel 82 and the original pixel 74, $a_m$, $a_{m+1}$ represent the signal levels of the original pixels 73, 74, and $a_n$ represents the signal level of the n-th pixel n.

By thus successively determining the signal levels of the pixels at positions corresponding to n from "1" to "1728", 3840 pixels can be compressed and signal levels of transmission pixels corresponding to the horizontal length of A4 paper can be obtained.

Figure 9:
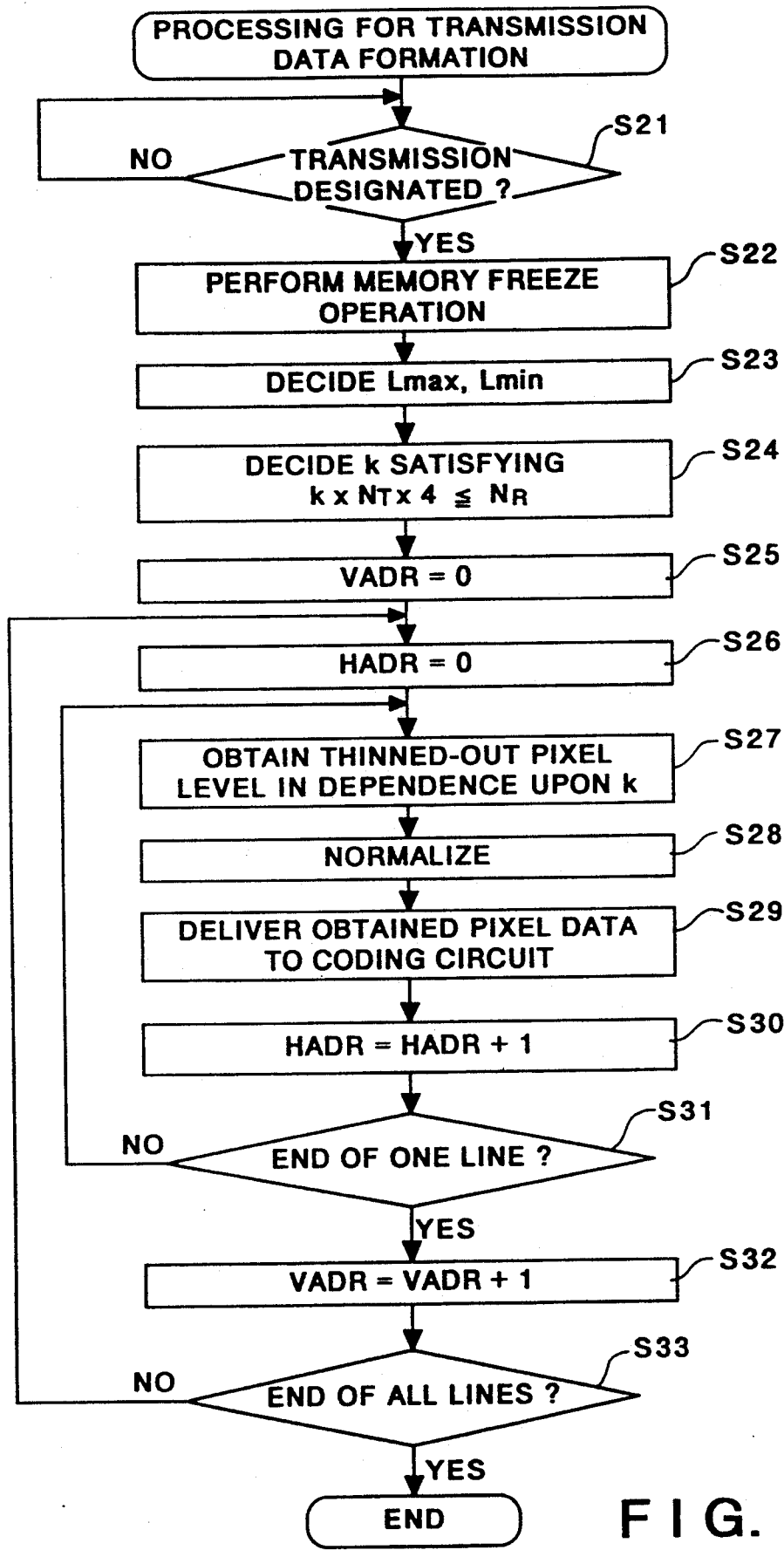
FIG. 9 is a flowchart illustrating processing, executed by a control circuit, for originating transmission data upon compressing image data.

FIG. 9 is a flowchart illustrating the processing for forming transmission data executed by the control circuit 115 of the invention. Here a case is illustrated in which the transmission image size is larger than that of the received image size. The control program for executing this processing is stored in the ROM of control circuit 115.

Steps of this processing identical with those of the flowchart of FIG. 3 need not be described in detail again. Steps S21 through S25 are almost the same as steps S1 through S4 of FIG. 3. However, the value of k decided at step S24 differs from that of step S4. This value will be "1" hereinafter.

The level of pixel data thinned out in dependence upon the value of k is obtained at step S27. The thinning out of the pixel data is performed based on the description rendered above in accordance with FIGS. 8A, 8B and Eq. (2). Step S28 calls for this thinned-out pixel data to be normalized in accordance with the foregoing Eq. (1). When the normalized transmission pixel data $L_T$ are obtained, the program proceeds to step S29, where $L_T$ is outputted to the coding circuit 120 as pixel data 119. The image data binary coded by the coding circuit 120 are modulated by the modulator circuit 121 and then outputted on line 122.

When the processing of the pixel data in the main scanning direction is thus ended, the horizontal address HADR of the transmitted pixel is incremented at step S30, and it is determined at step S31 whether the processing for one line (if the multi-image data of FIG. 7 are to be transmitted in size A4, 1728 pixels are obtained from the 3840 pixels of the original image) has ended. If the processing for one line has not ended, the program returns to step S27 to execute the foregoing processing. When processing for obtaining one line of pixel data ends, the program proceeds to step S32, at which the vertical address VADR is incremented, and then to step S33. If it is found here that processing for all lines of pixel data (2400 lines in the case of the image data shown in FIG. 7) has not ended, the program returns to step S6, the horizontal address HADR of the transmitted pixel data is made "0" and the first transmission pixel on the next line is designated. The processing described thus far is executed repeatedly until all lines of the transmission pixel data are obtained.

Figure 13:
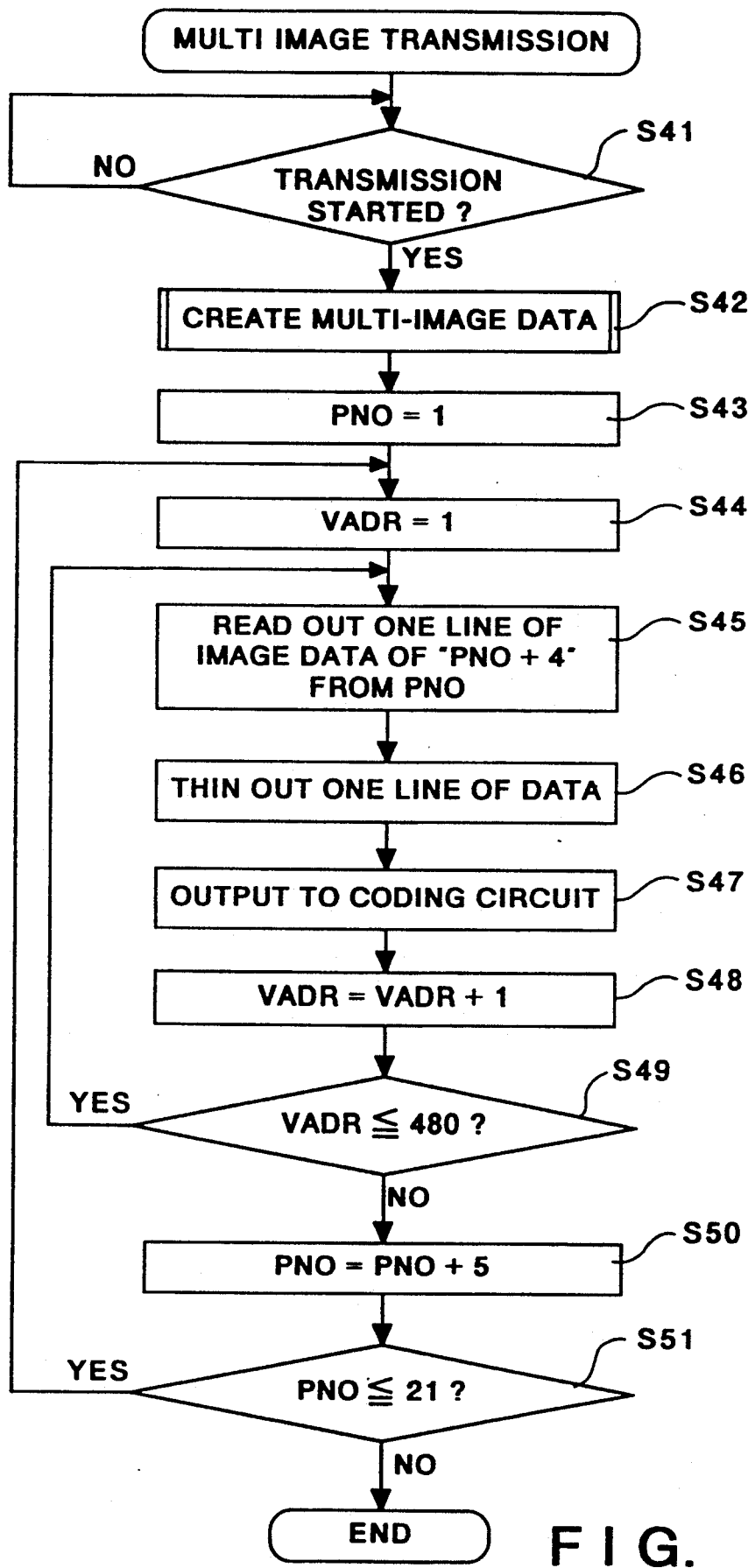
FIG. 13 is a flowchart illustrating processing in another embodiment of the invention.

FIG. 13 is a flowchart illustrating processing for creating multi-image data, thinning out the data and transmitting the same in size A4 in accordance with another embodiment of the invention. The control program for executing this processing is stored in the ROM 203.

When transmission of multi-image data is designated at step S41, multi-image data are created and stored in the RAM 202 at step S42. A pointer PNO is set to "1" at step S43, and the vertical address VADR is set to "1" at step S44. Next, at step S45, image data of the line designated by VADR, of five frames of image data indicated by PNO+4, are read from the image data indicated by PNO in FIG. 7. As a result, initially the first line of image data 1-5 is read out and stored in a line buffer 211. The program then proceeds to step S46, at which thinning out of line data stored in the line buffer 211 is executed to effect a conversion from 3840 pixels to 1728 pixels conforming to size A4 paper. The converted image data are coded by the coding circuit 120 and then transmitted on line 122. This thinning-out processing is carried out in the same manner as the thinning-out processing described earlier.

Next, at steps S48, S49, VADR is incremented and processing for 480 vertical lines of a television image is executed. When processing for 480 lines ends, the program proceeds to steps S50, S51, where the pointer PNO is incremented by +5 and processing proceeds to that for the image data 6-10 of FIG. 7. Thus, the foregoing processing is executed until the processing for all 25 frames ends.

Figure 14:
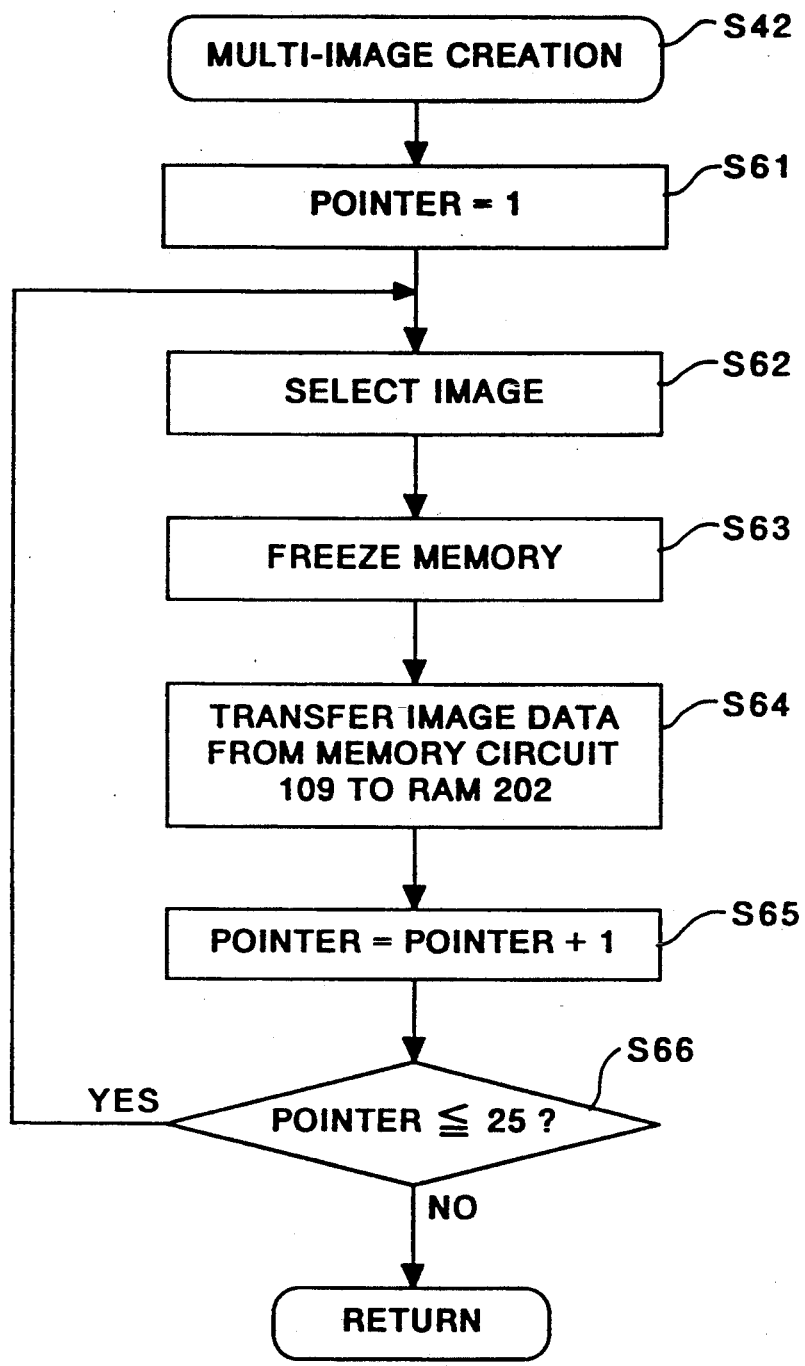
FIG. 14 is a flowchart illustrating the details of a multi-image creation processing step of FIG. 13.

FIG. 14 is a flowchart illustrating processing for creating the multi-image indicated at step S42 in FIG. 13.

When creation of multi-image data is designated, pointer 210 is set to "1" at step S61 and the read head 103 for reading the disk 100 is controlled to select read-out image data. When freezing of the read image data is designated at step S63, the image data in memory circuit 109 is frozen. Next, the program proceeds to step S64, at which the image data are read out of the memory circuit 109 and transferred for storage to the RAM 202. Next, at steps S65, S66, the pointer 210 of the image data is incremented and processing for multi-image creation is executed until the multi-image data comprising the total of 25 frames are formed in the RAM 202. The multi-image stored in RAM 202 thus becomes the multi-image data shown in FIG. 7.

Figure 10:
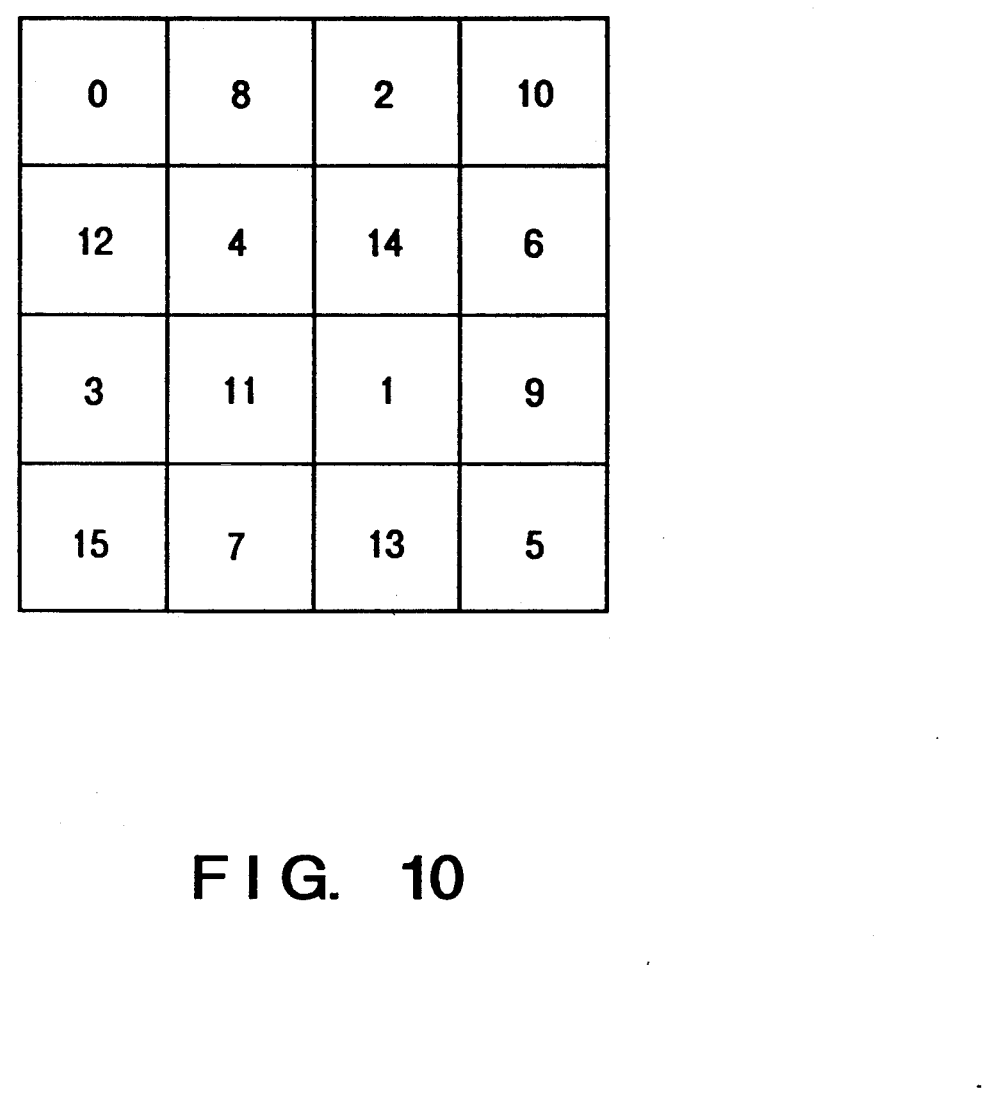
Figure 11:
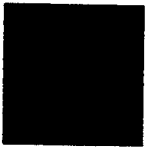
FIG. 11 is a view showing the relationship between luminance levels and dither patterns.
Figure 11:
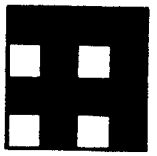
Figure 11:
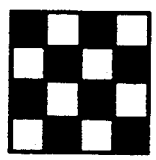
Figure 11:
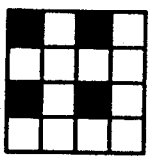
Figure 11:
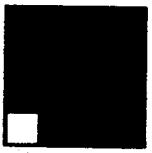
Figure 11:
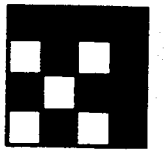
Figure 11:
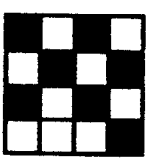
Figure 11:
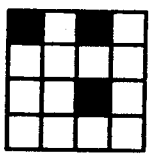
Figure 11:
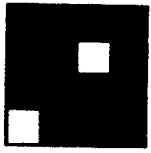
Figure 11:
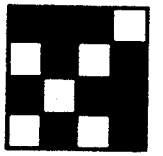
Figure 11:
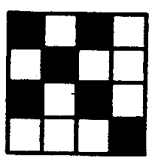
Figure 11:
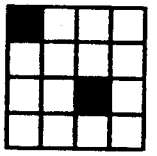
Figure 11:
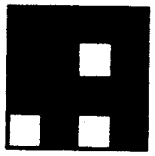
Figure 11:
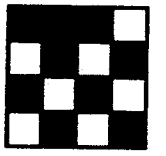
Figure 11:
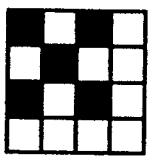
Figure 11:
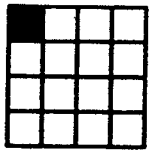

Description of Binary Coding Processing (FIGS. 10,11)

FIG. 10 is a view showing an example of a 4×4 dither matrix pattern used for the binary coding operation performed by the coding circuit 120. Each numeral of the matrix is binary coded in such a manner that, when each item of transmitted pixel data is above a luminance level that is 16 times the numeral, the pixel portion corresponding to this position is made black ("1").

This is illustrated in FIG. 11, which is a view schematically showing a binary-coding algorithm, based on the dither method, in the coding circuit 120. Black pixel generation patterns regarding the dither pattern of FIG. 10 are illustrated in correspondence with each luminance level range of the pixel data.

Thus, in case of a run length in accordance with GIII standards, the coding circuit 120 performs dither coding of the initial line of pixel data of the transmitted pixel data 119. At the time of transmission, run-length coding is carried out successively in the horizontal direction from the dots of the uppermost row, and the results are delivered to the modulator circuit 121. Since a transition is made to pixel data processing of the next line after four rows are processed, it will suffice to perform dither coding of the next line during the time that the four rows of run-length coding are being carried out.

In the foregoing embodiment, the binary coding in the coding circuit is performed by dither coding. However, the invention is not limited to such an arrangement, for it is permissible to carry out binary coding using the simplest central value as a threshold value. In addition, though a 4×4 dither pattern is employed hereinabove, it is possible to use a 3×3 or any other dither pattern.

Further, though a case is described above in which the image data are expanded when the image for transmission is smaller than the paper size on the receiving side, the invention is not limited to such case. It goes without saying that when the image data are greater than the paper size on the receiving side, the image data are compressed by thinning out pixels or by a suitable arithmetic operation.

Further, according to the foregoing embodiment, a television signal is entered, digitized into a multi-valued image signal and then binary coded and transmitted. However, this does not limit the invention. For example, it can be arranged so that when binary image data are entered, the data are expanded or compressed as is to conform to paper size before being transmitted.

In accordance with the embodiment as described hereinabove, the number of pixels transmitted conforms to a prescribed paper size. Therefore, regardless of the number of dots of the image output apparatus on the receiving side, the image data can be transmitted without loss of data and without wasting recording paper.

As many apparently widely different embodiments of the present invention can be made without departing from the spirit and scope thereof, it is to be understood that the invention is not limited to the specific embodiments thereof except as defined in the appended claims.

What is claimed is:

1. An image transmitting apparatus for binary coding an input image signal and transmitting the binary-coded image signal through a line, comprising:
    supplying means for supplying multi-valued image data which corresponds to a standard television signal;
    converting means for expanding or compressing the multi-valued image data based on a number of pixels constituting the multi-valued image data and a number of pixels constituting a prescribed paper size;
    binary coding means for binary coding the multi-valued image data expanded or compressed by said converting means; and
    transmitting means for transmitting the binary image data coded by said binary coding means.

2. The apparatus according to claim 1, wherein said binary coding means binary codes the multi-valued image data by a dither method.

3. The apparatus according to claim 2, wherein said converting means includes:
    means for deciding an expansion or compression ratio of the multi-valued image data based on the number of pixels constituting the multi-valued image data, the number of pixels constituting the prescribed paper size and a dither matrix size of said binary coding means; and
    means for expanding or compressing the multi-valued image data based on said ratio.

4. An image transmitting apparatus for binary coding an input image signal and transmitting the binary-coded image signal through a line, comprising:
    supplying means for supplying multi-valued image data;
    memory means for storing the multi-valued image data;
    discriminating means for discriminating paper size on which the image signal will be reproduced on a receiving side;
    expanding or compressing means for expanding or compressing the multi-valued image data based on a number of pixels constituting the multi-valued image signal stored in said memory means, and the paper size;
    binary coding means for binary coding the expanded or compressed multi-valued image data; and
    transmitting means for transmitting the binary image data, which has been binary coded by the coding means through a line to the receiving side.

5. The apparatus according to claim 4, wherein the input image signal is a video signal conforming to television standards.

6. The apparatus according to claim 4, wherein said device on the receiving side is a bi-level device.

7. The apparatus according to claim 4 further comprising:
    normalizing means for normalizing, on the basis of a maximum luminance level and minimum luminance level of a pixel stored in said memory means, the multi-valued image data expanded or compressed by said expanding or compressing means.

8. The apparatus according to claim 4, wherein said binary coding means binary codes the multi-valued image data by a dither method.

9. The apparatus according to claim 8, wherein said expanding or compressing means includes:
    means for deciding an expansion or compression ratio of the multi-valued image data based on the number of pixels constituting the multi-valued image data, the number of pixels constituting a prescribed paper size and a dither matrix size of said binary coding means; and
    means for expanding or compressing the multi-valued image data based on said ratio.

10. An image transmitting apparatus for binary coding a video signal and transmitting the binary-coded signal through a line, comprising:
    video input means for reading out a video signal stored in a medium;
    converting means for digitizing an analog image signal read out from said medium into a multi-valued image signal;
    memory means for storing the multi-valued image signal;
    discriminating means for discriminating paper size on which the image signal will be reproduced on a receiving side;
    expanding or compressing means for expanding or compressing the multi-valued image signal based on a number of pixels constituting the multi-valued image signal stored in said memory means, and the paper size;
    binary coding means for binary coding the expanded or compressed multi-valued image signal into binary image data;
    coding means for coding the binary image data binary coded by said binary coding means; and
    transmitting means for transmitting the image data, which has been coded by said coding means; and
    transmitting means for transmitting the image data, which has been coded by said coding means, through a line to the receiving side.

11. The apparatus according to claim 10, wherein said video signal is a video signal conforming to television standards.

12. The apparatus according to claim 11, wherein said converting means converts a luminance signal of said video signal into a multi-valued image signal.

13. The apparatus according to claim 10, further comprising:
    display means for displaying said video signal; and
    designating means for designating transmission of image data displayed on said display means.

14. The apparatus according to claim 10, further comprising:
    normalizing means for normalizing, on the basis of a maximum luminance level and minimum luminance level of a pixel stored in said memory means, the multi-valued image signal expanded or compressed by said expanding or compressing means;
    said binary coding means binary coding the normalized multi-valued image signal.

15. The apparatus according to claim 10, wherein said binary coding means binary codes the multi-valued image signal by a dither method.

16. The apparatus according to claim 15 wherein said expanding or compressing means includes: means for deciding an expansion or compression ratio of the multi-valued image signal based on the number of pixels constituting the multi-valued image signal stored in said memory means, the number of pixels constituting the paper size and a size of a dither matrix pattern; and
means for expanding or compressing the multi-valued image signal based on said ratio.

17. An image processing apparatus, comprising:
memory means for storing an image data of one screen as multi-valued image data when input image data is supplied;
supplying means for supplying said multi-valued image data stored in said memory means to a monitor so as to be displayed as a visual image;
transform means for expanding or compressing said multi-valued image data stored in said memory means based on a size of paper at a receiving side; and
binary coding means for binary coding multi-valued image data transformed by said transform means.

18. The image processing apparatus according to claim 17, wherein said input image data conforms to television standards.

19. The image processing apparatus according to claim 17, wherein said binary coding means for binary coding uses a dither method.

20. The image processing apparatus according to claim 17, wherein said input image data is color image data.

21. The image processing apparatus according to claim 17, further comprising:
transmitting means for coding binary image data coded by said binary coding means and for transmitting said binary image data through a communication line.

22. An image processing apparatus, comprising:
generating means for generating image data which is composed of a plurality of individual frames, said image data being multi-valued image data;
coding means for collectively coding said image data from all of the plurality of individual frames together; and
transmitting means for transmitting the coded image data coded by said coding means through a communication line to a receiver,
said coding means being adapted to thin out said image data when an image size of said image data from all of the plurality of individual frames together is larger than an image size of said receiver.

23. The apparatus according to claim 22, further comprising:
means for retrieving said multi-valued image data from a recording medium.

24. The apparatus according to claim 22, wherein said generating means includes memory means for storing said multi-valued image data.

25. The apparatus according to claim 22, wherein said coding means codes said image data into binary image data by means of a dither method.

26. The apparatus according to claim 22, further comprising:
means for expanding or compressing said image data according to the size of a paper on a receiving side.

* * * * *

UNITED STATES PATENT AND TRADEMARK OFFICE
CERTIFICATE OF CORRECTION

PATENT NO. : 5,319,471
DATED : June 7, 1994
INVENTOR(S) : MASAHIRO TAKEI, ET AL.

It is certified that error appears in the above-identified patent and that said Letters Patent is hereby corrected as shown below:

COLUMN 3

Line 51, "view" should read --view of--.
    Line 54, "view" should read --view of--.

COLUMN 8

Line 23, "L(6)={l(4)+4×l(5)}/Z5," should read
           --L(6)={l(4)+4×l(5)}/5,--.

COLUMN 14

Line 1, "claim 4" should read --claim 4,--.

COLUMN 15

Line 4, "claim 15" should read --claim 15,--.

Signed and Sealed this

Twenty-second Day of November, 1994

Attest:

BRUCE LEHMAN

Attesting Officer    Commissioner of Patents and Trademarks